(12) United States Patent  (10) Patent No.: US 8,175,461 B2
Sone et al.  (45) Date of Patent: May 8, 2012

(54) OPTICAL MODULE IMPLEMENTED WITH TRI-PLEXER OPTICAL SUBASSEMBLY

(75) Inventors: Hidemi Sone, Yokohama (JP); Manabu Ishikawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 441 days.

(21) Appl. No.: 12/413,160

(22) Filed: Mar. 27, 2009

(65) Prior Publication Data

US 2009/0245800 A1 Oct. 1, 2009

Related U.S. Application Data

(60) Provisional application No. 61/071,003, filed on Apr. 8, 2008.

(30) Foreign Application Priority Data

Mar. 28, 2008 (JP) ................................. 2008-086629

(51) Int. Cl.
*H04B 10/00* (2006.01)
*G02B 6/36* (2006.01)
*G02B 6/00* (2006.01)
(52) U.S. Cl. ............. 398/135; 385/89; 385/94; 385/135
(58) Field of Classification Search .................. 398/135; 385/14, 88–89, 92–94, 79, 135–139
See application file for complete search history.

(56) References Cited

U.S. PATENT DOCUMENTS

| 7,093,988 | B2 | 8/2006 | Tsumori |
| 7,438,480 | B2 | 10/2008 | Okada et al. |
| 2002/0065052 | A1* | 5/2002 | Pande et al. .................. 455/67.5 |
| 2002/0168152 | A1* | 11/2002 | Abe et al. ......................... 385/88 |
| 2007/0071444 | A1* | 3/2007 | Okada et al. .................. 398/135 |

FOREIGN PATENT DOCUMENTS

JP 2005-099482 4/2005

* cited by examiner

*Primary Examiner* — Dawayne A Pinkney
(74) *Attorney, Agent, or Firm* — Venable LLP; Michael A. Sartori; Leigh D. Thelen

(57) ABSTRACT

An optical module that implements with a tri-plexer assembly is disclosed. The tri-plexer module comprises a bi-directional module for transmitting digital input and output signals and an analogue optical assembly for receiving analog optical signals. The bi-directional module installs both a light-emitting device and a light-receiving device in a signal package. The analogue optical assembly is assembled such that the optical axis thereof makes a substantially right angle with the optical axis of the bi-directional module. The signal ground of the module is common to the analogue module and to a section for receiving the digital data; while, the chassis ground or the frame ground in the module is isolated from the signal ground.

10 Claims, 12 Drawing Sheets

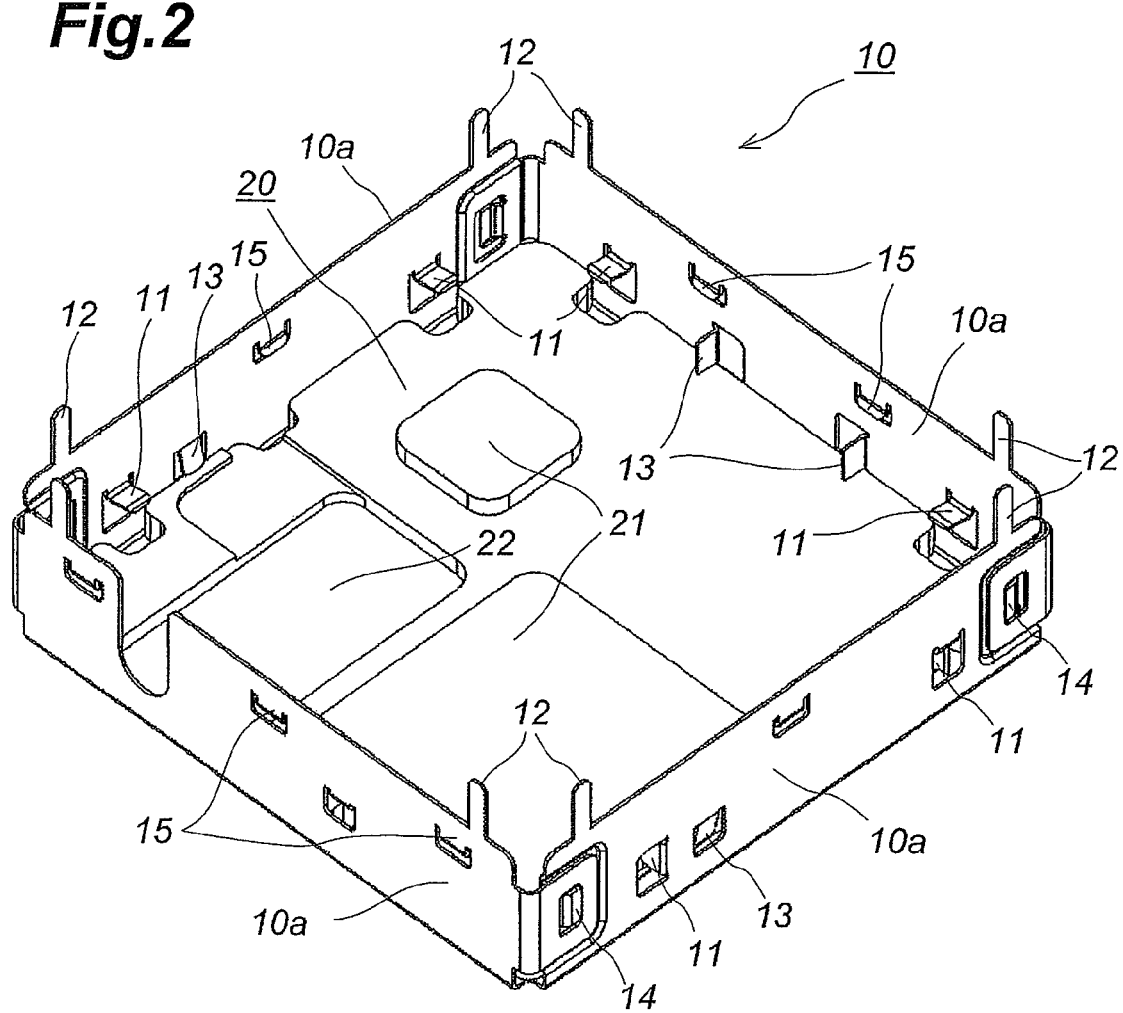

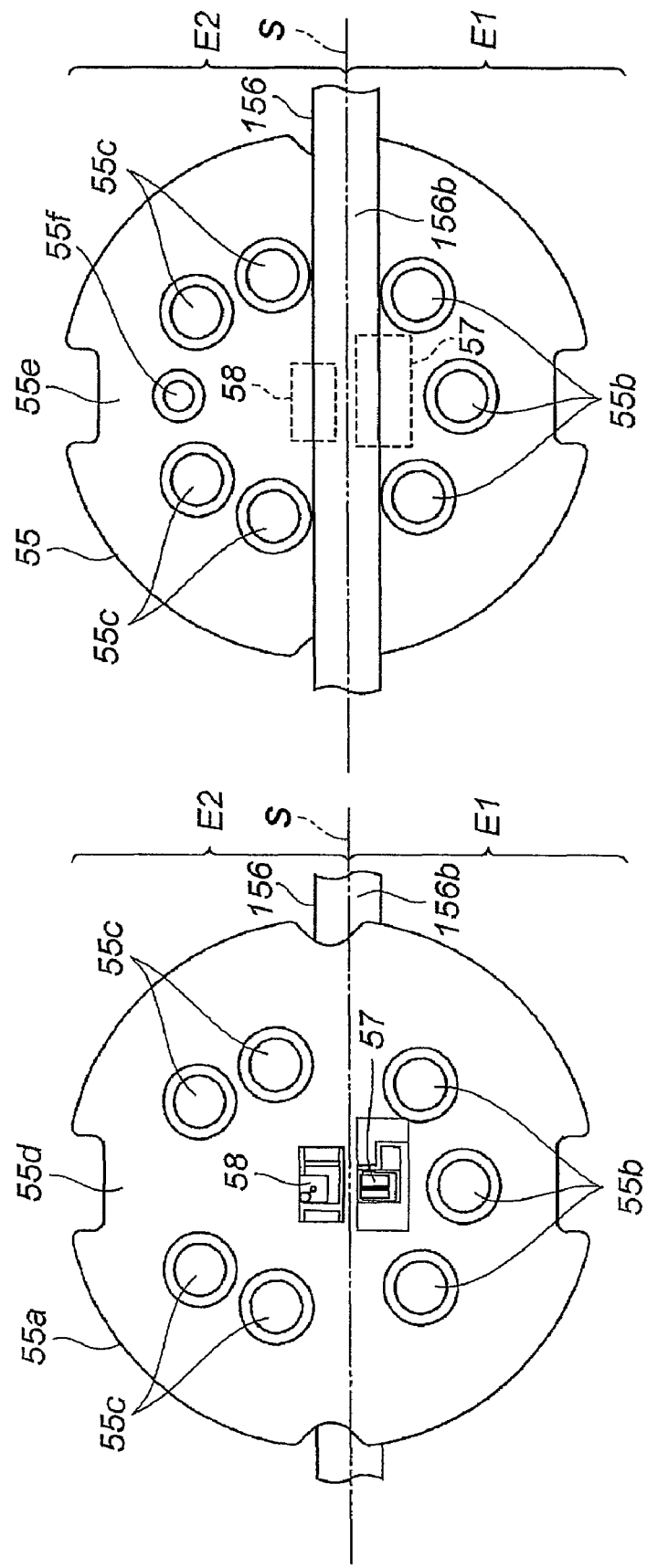

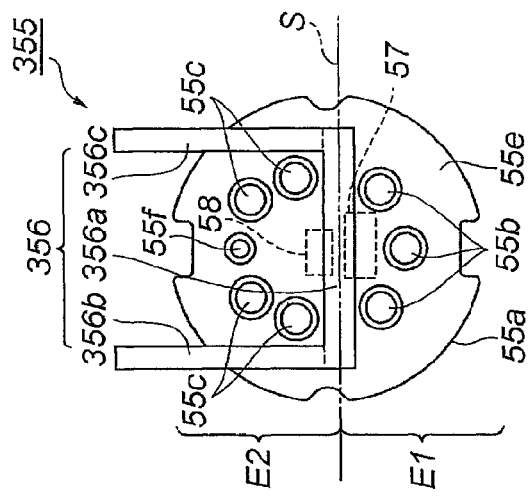
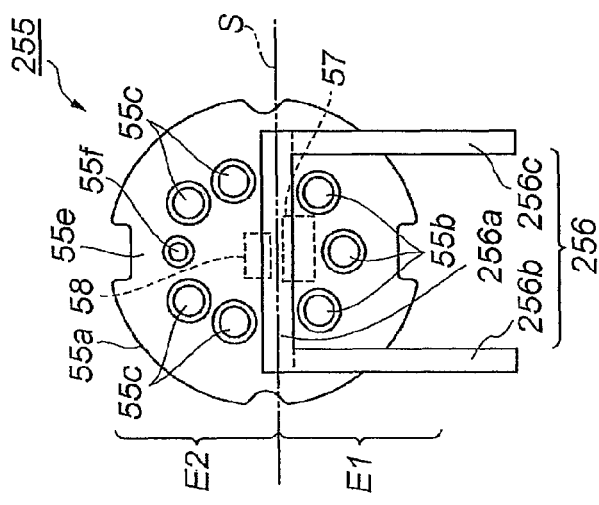
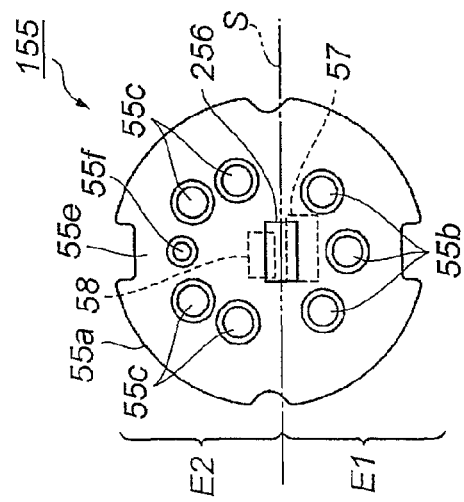

OPTICAL MODULE IMPLEMENTED WITH TRI-PLEXER OPTICAL SUBASSEMBLY

CROSS REFERENCE TO RELATED APPLICATIONS

The present application claims the priority of U.S. Provisional Patent Application Ser. No. 61/071,003 filed on Apr. 8, 2008.

BACKGROUND OF THE INVENTION

1. Field of the Invention

The present invention relates to an optical module 1 that handles three types of optical signals and is usable in the optical CATV system.

2. Related Prior Arts

The PON system (Passive Optical Network system) transmits and receives two types of optical signals, each having wavelengths of 1.31 µm and 1.55 µm through a single optical fiber 50. A bi-directional optical module 1 applicable to this PON system is necessary to provide, in addition to a light receiving device and a light-transmitting device, a WDM (Wavelength Division Multiplexing) coupler or a WDM filer. A Japanese Patent Application published as JP-2005-099482A has disclosed such a bi-directional optical module 1. This optical module 1 has two devices each installing the semiconductor light-receiving device or the semiconductor light-transmitting device.

A United States Patent, the U.S. Pat. No. 7,093,988, has disclosed another type of the bi-directional optical module 1 as one modification of the module above, in which a semiconductor device to receive signal light and another semiconductor device to transmit another signal light are housed within a single package accompanied with the WDM filter. In this modified optical module 1 shown in FIG. 1 of the prior art, within the package comprised of the stem 114 and the cap 110 with the lens is enclosed with the light-transmitting device 113 and the light-receiving device 112. The light emitted from the light-transmitting device 113 couples with the optical fiber 132 after it is reflected by the WDM filter 115 and focused by the lens 116. On the other hand, the light provided from the optical fiber 132 couples with the light-receiving device 112 after it is focused by the lens 116 and passes through the WMD filter 115.

Such a bi-directional module with a single package, when it is installed in an optical communication system, may leave a space in a side of this bi-directional module for another functional device to be installed therein. From the viewpoint of the system configuration, one request to transmit another optical signal in an analog form, in addition to digital optical signals each being transmitted in up-and-down directions, has become practical; in particular, the optical CATV (Cable Television) system has strongly demand this new configuration.

The conventional CATV system that uses a copper cable has transmit analogue video signals, whose frequency range is 100 to 700 MHz, from the center station to respective subscribers by the frequency multiplexing, while, each subscriber has upload digital signals with a frequency range below 50 MHz to the center station. Currently, the optical CATV system first converts the downward video signal into an optical signal with the same frequency spectrum of the analogue electrical signal explained above. In addition, the CATV system now strongly demands to access the internet system optically. Thus, the current CATV system is necessary to handle three types of optical signals, one is the downward video signal and the other two are the upward and the downward digital signals for the internet access.

To satisfy the request in the current CATV system mentioned above, a new architecture has been proposed in which three optical signals are transmitted by multiplexing different wavelengths. The downward video signal assigns 1.55 µm, the downward digital signal assigns 1.49 µm, and the upward digital signal assigns 1.31 µm. The optical module 1 applicable to such a new optical CATV system provides the bi-directional module with the single package that handles the upward and the downward digital signals, and an optical-receiving module for the analog video signal set in the side of the module where the conventional bi-directional module with two or more packages assembles the light-receiving module. This type of the optical module 1 is what is called as tri-plexer.

The analog video signal has a frequency range from 40 to 870 MHz with the frequency multiplexing configuration and the wavelength of 1.55 µm, while, the downward digital signal may have several standards, for instance, a standard whose transmission speed up to 620 Mbps is called as BPON, those up to 1.25 Gbps is called as EPON, and those up to 2.5 Gbps is called as GPON. The present invention relates to this type of the tri-plexer and an optical module 1 installing such a tri-plexer.

SUMMARY OF THE INVENTION

A feature of the present invention relates to an optical module applicable to the GPON system that transmits two digital signals with wavelengths of 1.3 µm and 1.48 µm and one analog signal with a wavelength of 1.55 µm. The optical module comprises a tri-plexer optical subassembly that provides an analog module, a bi-directional module, and a WDM filter. The analog module receives the optical signal with the wavelength of 1.55 µm. The bi-directional module, which has a single package that commonly installs a semiconductor light-receiving device and a semiconductor light-emitting device, receives the first digital signal with a wavelength of 1.48 µm and transmits the second digital signal with a wavelength of 1.3 µm. The WDM filter discriminates the optical signal with the wavelength of 1.55 µm from the other optical signals with wavelengths of 1.48 µm and 1.3 µm, respectively. In the present optical module, the analog module and the bi-directional module are assembled substantially in a right angle with respect to each other to isolate an analog circuit from a digital circuit electrically.

The optical module may further comprise a housing, a printed circuit board and a ground plate. The housing includes a base, which is made of resin, a heat sink and a metal shell to form a space within which the tri-plexer subassembly and the circuit board is installed. The metal shell provides a frame ground of the optical module, while, the signal ground is implemented on the printed circuit board. The printed circuit board installs the first circuit that is coupled with the analog module and processes the analog signal and a second circuit that is coupled with the bi-directional module and processes the digital signal. The first circuit is electrically isolated from the second circuit except for the signal ground. The heat sink, which is set within a ceiling of the metal shell and is made of relatively thicker metal, provides a heat-dissipating path from the electronic circuit to the exterior of the optical module through the metal shell.

The ground plate is fixed to the bi-directional module and to the printed circuit board so as to distinguish the lead pins for the light-receiving section from the lead pins for the light-transmitting section. Accordingly, the ground plate has functions of: (1) grounding the bi-directional module on the signal ground on the printed circuit board; (2) electrically shielding the light-receiving section from the light-transmitting section; (3) supporting the rear portion of the tri-plexer optical subassembly with respect to the printed circuit board; and (4) dissipating heat generated in the bi-directional module directly to the printed circuit board without coming in contact with the heat sink, which may thermally isolate the tri-plexer optical sub-assembly from the heat sink.

BRIEF DESCRIPTION OF THE DRAWINGS

FIG. 2 illustrates the metal shell assembled with the heat sink in the interior thereof;

FIGS. 10A and 10B minutely describe the arrangement of the ground plate with the stem of the bi-directional module according to the second embodiment shown in FIGS. 9A and 9B;

FIG. 11A schematically illustrates anther arrangement of the ground plate according to the third embodiment of the invention, and FIGS. 11B and 11C illustrate still another type of the ground plate according to the fourth embodiment of the invention.

DETAILED DESCRIPTION OF THE PREFERRED EMBODIMENTS

Next, preferred embodiments according to the present invention will be described as referring to accompanying drawings.

Figure 1:
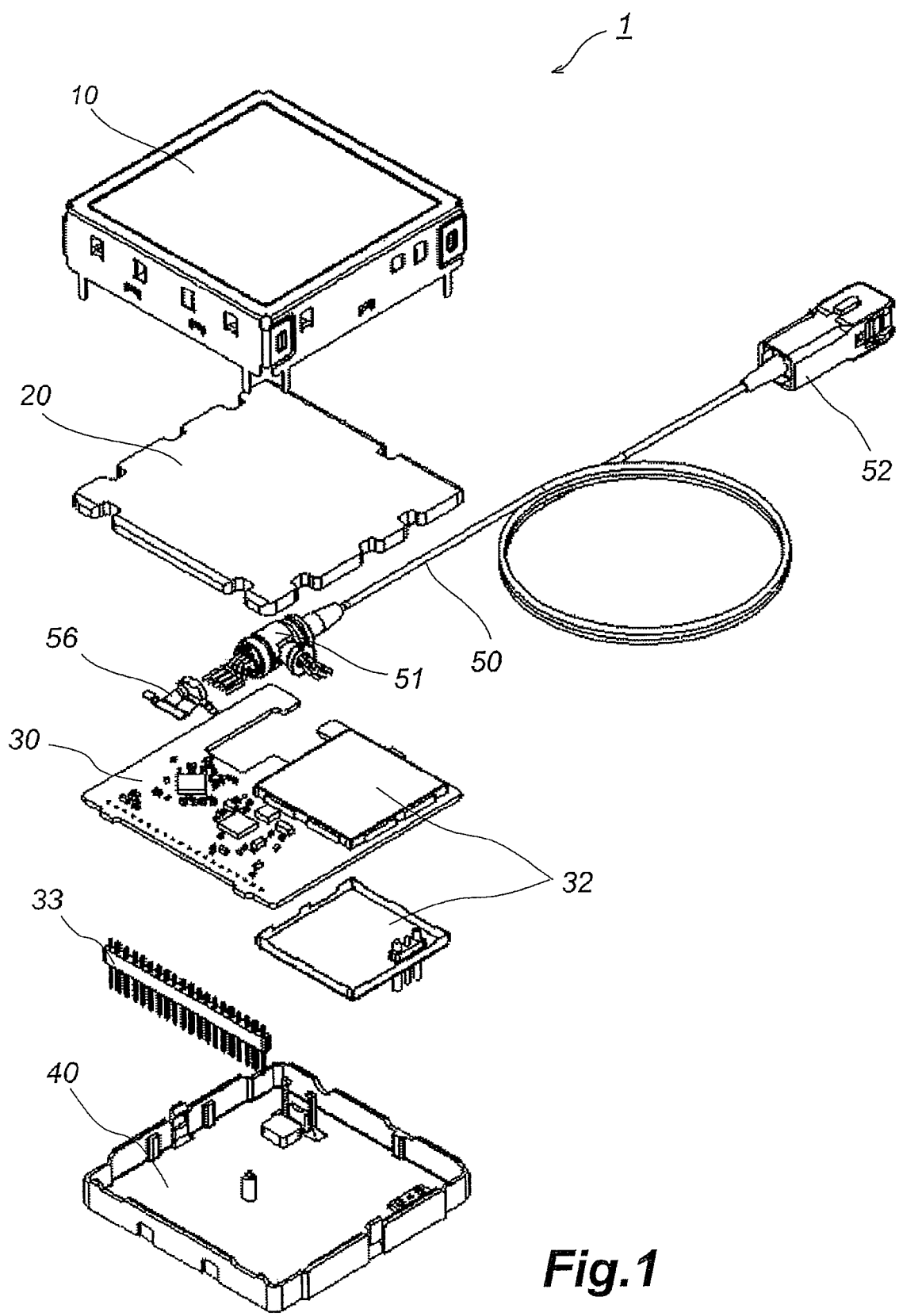
FIG. 1 is an exploded view of the optical module according to an embodiment of the invention.

FIG. 1 is an exploded view of an optical module 1 according to an embodiment of the present invention. The optical module 1 installs a printed-circuit board (hereafter denoted as PCB) 30, a tri-plexer optical sub-assembly (hereafter denoted as OSA) 51, and a heat sink 20 within a package comprised of a base 40 and a metal shell 10. The metal shell 10 is made of stainless plate with a thickness of about 0.2 mm, which is hard to absorb and to dissipate heat generated in the OSA 51 and the ICs on the PCB 30. Accordingly, the interior of the shell 10, which corresponds to the ceiling of the module 1, attaches a heat sink 20 made of aluminum (Al) slab with a thickness of about 3 mm to absorb heat from the OSA 51 and to conduct heat.

FIG. 2 illustrates the interior of the shell 10 assembled with the heat sink 20. The shell 10 is formed by cutting and bending a single metal sheet, and provides self lock latches 14 in four corners thereof to fix the sides 10a and heat sink latches 13 to assemble the heat sink 20 in respective four sides 10a. These self lock latches 14 and heat sink latches 13 are formed by cutting a portion of the sides 10a in the U-shape and bending inwardly an inner portion of this U-shaped cut to form a stopper. The shorting fingers 11 ground the shell 10 by making contact with the ground pattern on the PCB 30. On the other hand, the non-shorting fingers 12 only mechanically fixes the optical module 1 to the mother board (not shown in the figures) that mounts this optical module 1 by penetrating in the via-hole on the mother board and bending a tip portion of the non-shorting finger 12 at the other side of the mother board. The non-shorting fingers 12 may fix the optical module by soldering them to the land attributed with the via-hole of the mother board. By electrically isolating the via-hole from the ground in the mother board, the shell 10 of the optical module may be also isolated from the mother ground. The base latches 15 are provided to fix the base 40 with the shell 10.

The heat sink 20 shown in FIG. 2 provides a hollow 22 and a plurality of terraces 21. The hollow 20 receives the tri-plexer OSA 51 but not comes in directly contact with the tri-plexer OSA 51, while, one of terraces 21 comes in directly contact with the ICs for the digital signal mounted on the PCB 30 that generate heat, and the other terrace 21 comes in contact with the shield box 32 to shield a portion of the PCB 30 where the analogue circuit is mounted. That is, the ICs and the shield box 32 comes in thermally contact with the corresponding terraces 21 via a thermal sheet, thermal grease, or the like. On the other hand, the tri-plexer OSA 51 may be thermally isolated from the heat sink 20. Because the tri-plexer OSA 51 mounts a light-emitting device, typically a laser diode (hereafter denoted as LD), whose performances are most sensitive to temperatures, the thermal isolation of the heat dissipating path of the tri-plexer OSA 51 from the heat sink may make the operation of the tri-plexer OSA 51 in stable.

Figure 3A:
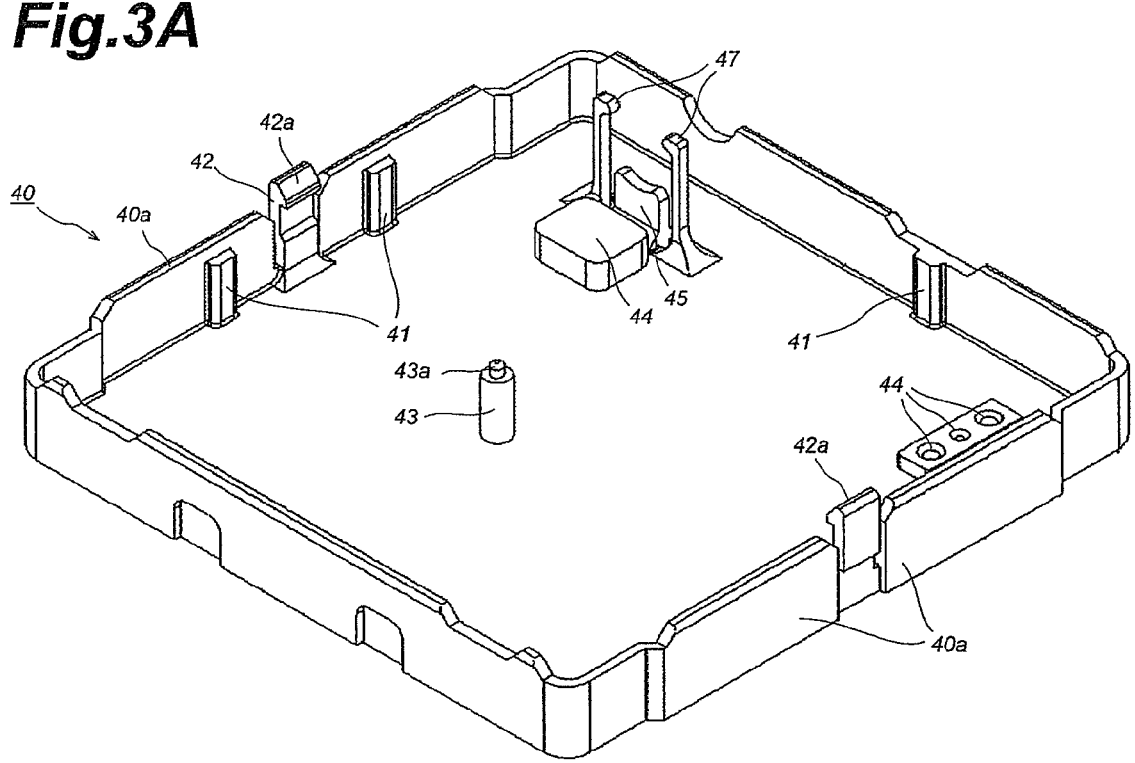
FIG. 3A illustrates the base made of resin without the printed circuit board.

FIG. 3A illustrates the base 40. The base 40 is made of resin, plastics or the like with a thickness of about 0.5 mm, at a thinnest portion thereof, and has a box shape. Several ribs 41 are formed inside of respective sides 40a, and the PCB 30 is mounted on these ribs 41, that is, the top of respective ribs supports the PCB 30 to secure a space under the PCB 30. On sides facing to each other are formed with a snap fit 42 with a hooked end 42a. The PCB 30 is placed on the rib 41 and snapped with this hooked end 42a. The base 40 further provides a post 43 with a stepped top 43a in a center portion of the base 40. Inserting a tip with a smaller diameter of the stepped top 43a into a via-hole 33a of the PCB 30, the post 43 not only supports but aligns the PCB 30. Three connector via-holes 44 are formed in a corner of the base 40 where the analogue circuit for the video signal is assembled. The analog signal received by the tri-plexer OSA 51 and processed by the analogue circuit on the PCB 30 may be extracted from the optical module 1 through lead pins that pass the connector via-holes 43. The center hole is for the lead pin for the analogue ground, while the holes in both sides are for lead pins for the analogue signals complementary to each other.

Figure 3B:
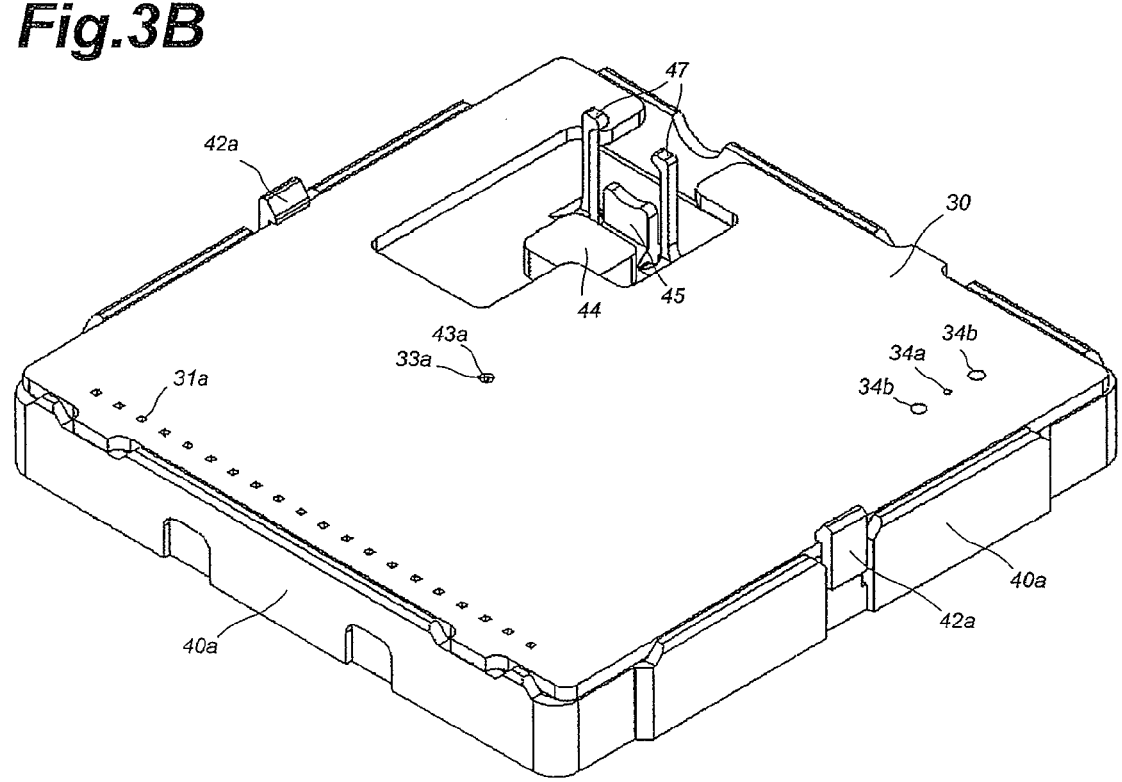
FIG. 3B illustrates the base assembled with the printed circuit board but omitting the tri-plexer optical subassembly.

FIG. 3B illustrates the base 40 assembled with the PCB 30. FIG. 3B omits the tri-plexer OSA 51, electronic components such as ICs on the PCB 30, and the shield box 32 for the analogue circuit. The PCB 30 configures with a row of lead pins 31a along one side thereof opposite to the side where the tri-plexer OSA 51 is to be mounted. Another side of the PCB 30 arranges the other three lead pins for the analog signal, the center of which has a smaller diameter compared with the side pins. In the present embodiment, the center pin corresponds to the analog ground, while, the side pins transmit the analog signals as described above.

Figure 4:
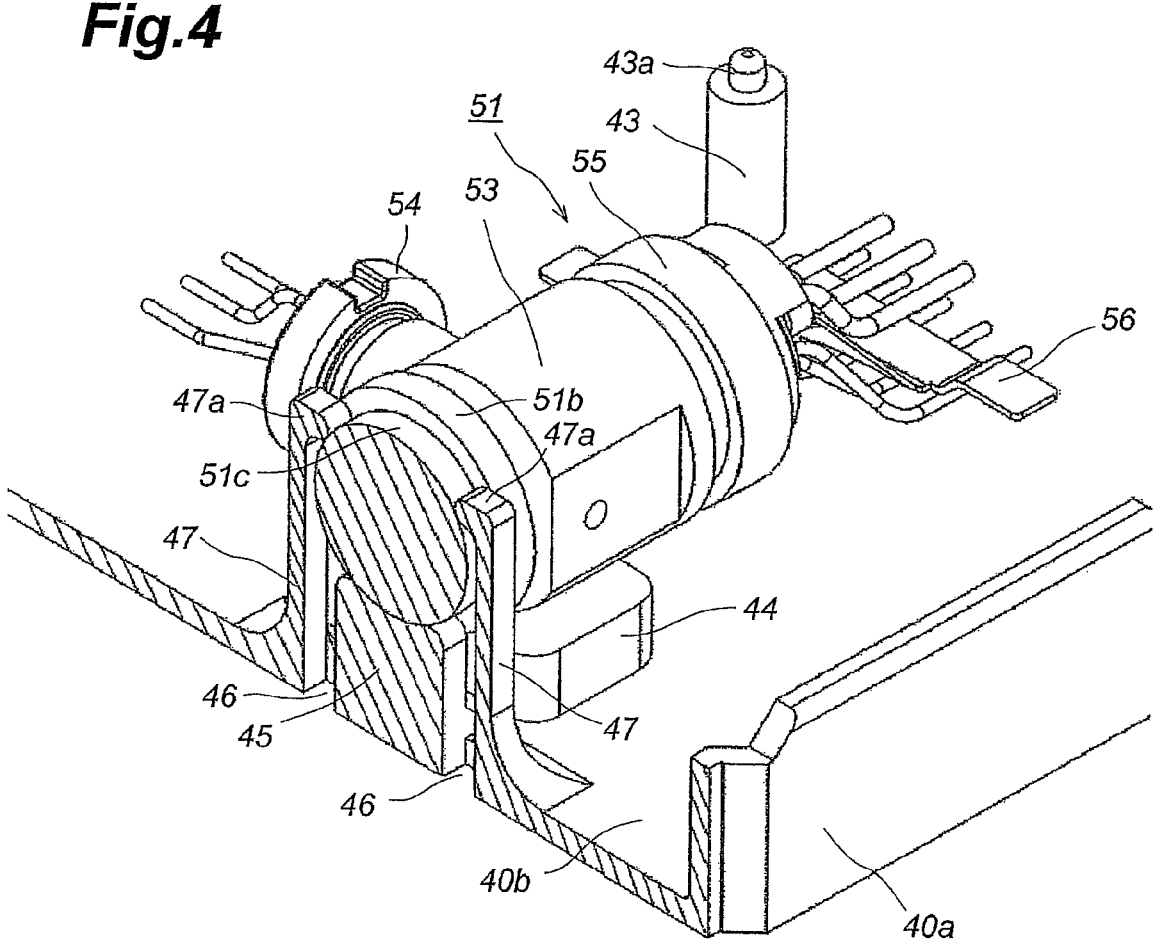
FIG. 4 is a magnified view showing a portion where the tri-plexer optical subassembly in a front portion thereof is installed on the base.

FIG. 4 illustrates the tri-plexer OSA 51 mounted on the base 40. As shown in FIG. 4, the OSA 51 is fixed on the base 40 such that the body portion 53 of the OSA 51, in which the WDM filter is mounted as explained later, is set on the terrace 44 of the base 40 and a portion 51c with a smaller diameter between two flanges 51b is put between the hooked latches 47 protruding from the bottom 40b of the base 40. The hook 47a in a tip of this latch 47 protrudes toward the other latch 47. When the OSA 51 is to be set, these hooked latches 47 are bent so as to broaden the hooked end 47a from the root portion thereof, and, after the OSA 51 in the portion 51c between the flanges 51b is set on the saddle 45, these hooked ends 47a press the portion 51c against the saddle 45. The base 40 in the bottom 40b thereof provides the holes 46 in the root portion of the latch 47 to facilitate the broadening of the latch 47 when the OSA 51 is to be set.

Figure 5:
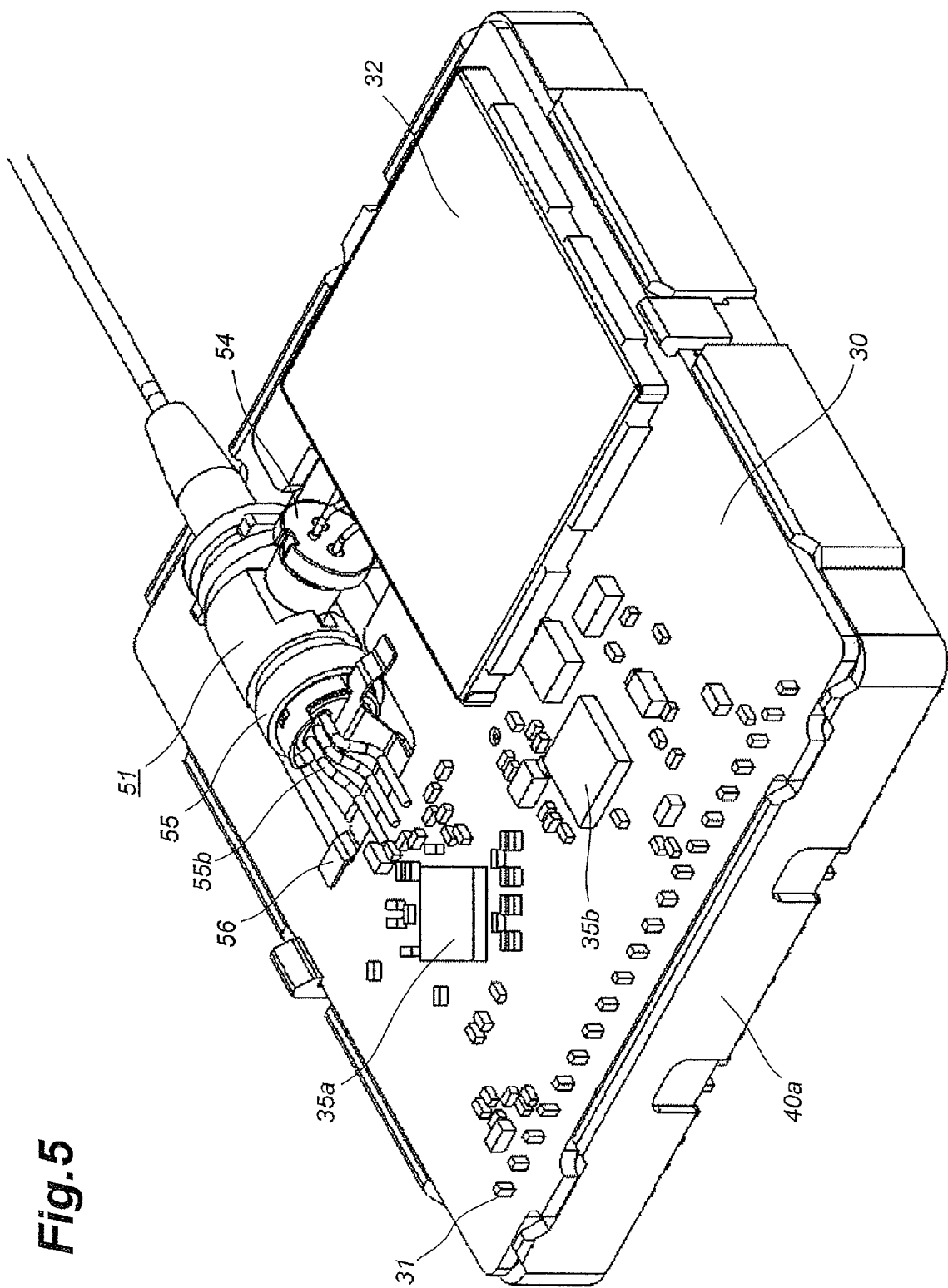
FIG. 5 illustrates the interior of the optical module where the printed circuit board, the tri-plexer optical subassembly are assembled with the base but the metal shell is omitted.

FIG. 5 illustrates the assembly of the PCB 30 with the electronic circuit thereon and the OSA 51 each mounted on the base 40. Comparing FIG. 5 with FIG. 3B and FIG. 6, the tri-plexer OSA 51 is set in a preset position on the base 40 as facing the analogue module 54 toward the center of the PCB 30. The PCB 30 provides the T-shaped cut to set the analogue module 54 in the center bar of this T-shape continuous to a cut corresponding to the horizontal bar of the T-shape for setting the body 53 of the tri-pexer OSA 51. The analogue module 54 extends three lead pins (SIC; Vcc and GND) to be soldered on each pattern on the PCB 30. The GND lead pin is common to the package of the tri-plexer OSA 51 by directly connecting with the stem 54a of the analogue module 54. While, the digital signals, namely, the Tx digital signal and the Rx digital signal, are extracted from the stem 55a of the digital module 55 such that the lead pins 55b for the Tx signal are connected in the back side of the PCB 30; while the lead pins 55c for the Rx signal are guided to the front side of the PCB 30. The digital module 55, which is a portion removing the analog module 54 and the body portion 53 from the OSA 51, will be hereinafter called as the bi-directional module.

Between the Tx lead pins 55c and the Rx lead pins 55b is provided with a ground plate 56 whose both ends are soldered with the ground patterns on the PCB 30. This ground plate 56 secures the electrical isolation between the Tx signal and the Rx signal. Moreover, the ground for the Tx signal and that for the Rx signal are also electrically isolated from each other in the present OSA 51. The ground pin for the Rx signal is directly connected to the package of the OSA 51 and is common to the analogue ground, while, the ground for the Tx signal is isolated from the Rx ground. This is because the Tx signal has the largest amplitude among signals in the tri-plexer OSA 51. Moreover, the Tx signal has the current mode to drive the LD. Accordingly, the Tx signal causes the strongest influence to the other signals, namely, the analogue signal and the Rx digital signal. Without the reinforced ground for the digital Tx signal, the common impedance is inherently formed in the ground pattern, which becomes a noise source to degrade not only the sensitivity of the receiver but the crosstalk between the Tx signal and the Rx signal. This crosstalk may be reduced by isolating the Tx ground from the Rx ground.

The analogue signal, because the amplitude thereof is far smaller than that of the digital signals and it configures the frequency multiplexed signal, is sensitive to the electromagnetic radiation. Accordingly, the shield box 32 covers the whole portion of the analogue circuit on the PCB 30 to be able to escape from the EMI radiation. The Tx digital signal, which is conducted in the back side of the PCB 30 from the OSA 51, is guided to the IC 35b installed on the top surface of the PCB 30 through the via-holes. Thus, the back surface of the PCB 30 does not install any active devices.

Along one edge of the PCB 30 is arranged with connector pins 31 to transmit the digital signals. Because the optical module 1 shown in the figures processes the digital signal whose transmission speed is 2.5 Gbps at fastest in the GPON system, the connector pins 31 are unnecessary to provide the impedance matched arrangement. The connector pins 31 of the present configuration may transmit such digital signals with the speed of 2.5 Gbps without substantial degradation in the signal form. An arrangement, where both sides of the signal pins (Tx, Rx and /Rx, here "/" means the complimentary signal) are provided with pins with the low impedance such as the power supply Vcc and the ground GND, may transmit the signal with suppressed degradation.

The OSA 51 provides a sleeve 57 in the front end thereof with a pair of flanges 51b. As already explained, the OSA 51 is fixed to the base 40 by setting the necked portion 51c between the flanges 51b by the hooked latch 47. The OSA 51 provides, continuous to the sleeve 57, a body 55 that installs the WDM filter to divide the light with the wavelength of 1.55 µm, which transmits the analog signal, from the light with the wavelengths shorter than 1.55 µm, which transmits the digital signals. The WDM filter of the present embodiment is configured with a multi-layered dielectric film on a substrate transparent for wavelengths shorter than 1.55 µm. The light with the wavelength of 1.55 µm heads for the analogue module 54 by being reflected by the WDM filter. The analogue module 54 only mounts the photodiode on the stem 54a thereof without any pre-amplifier thereon.

Figure 6:
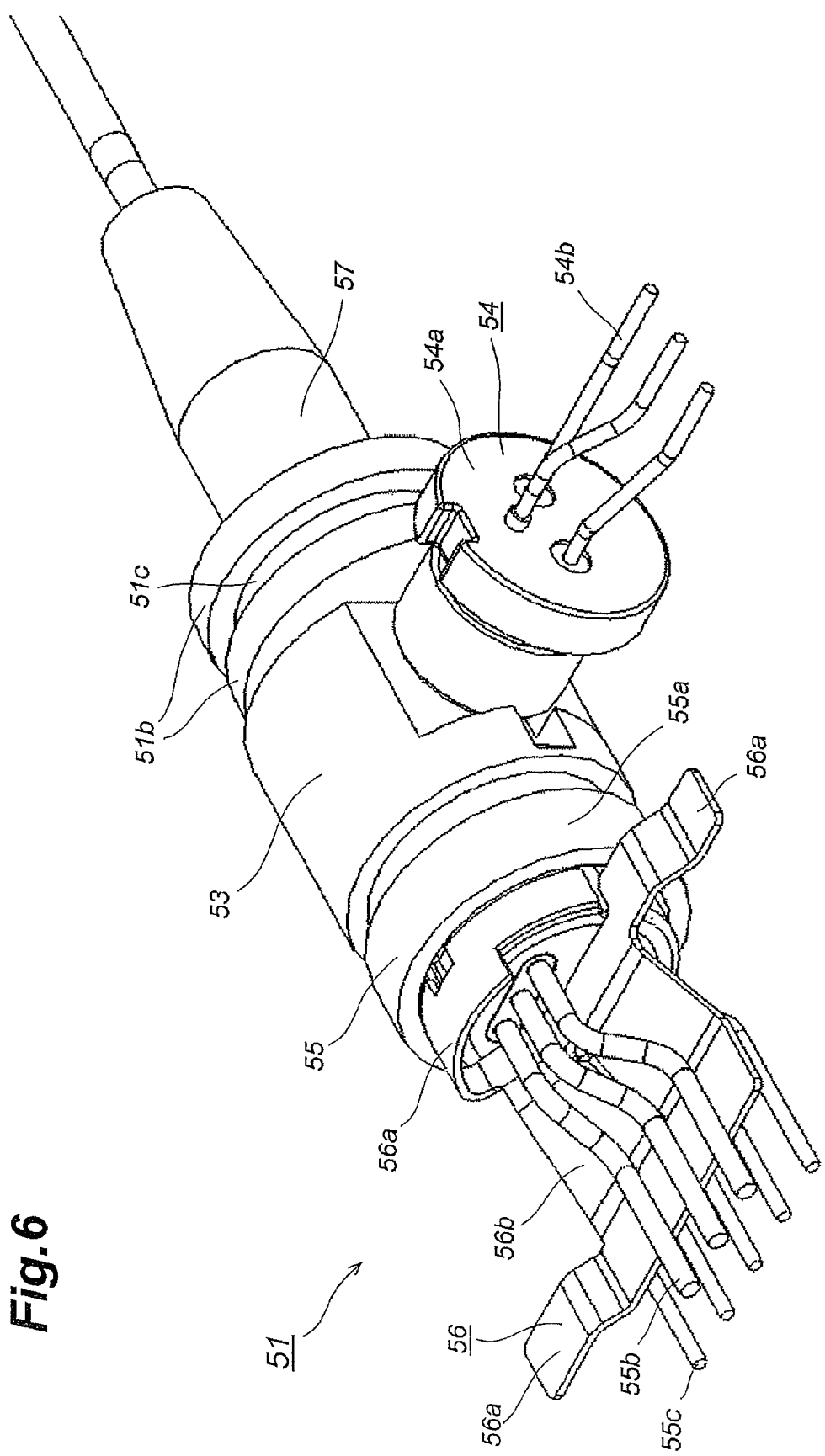
FIG. 6 is a perspective view of the tri-plexer optical subassembly with the ground plate of the first embodiment, which is installed in the optical module.

The light with the wavelengths shorter than 1.55 µm heads for the bi-directional module 55. Strictly, the light coming from the optical fiber transmits through the WDM filter or the light output from the bi-direction module 55 is emitted from the OSA 51 to the optical fiber. The bi-directional module 55 configures with lead pins extending from the stem 55a thereof, in which an upper half of the stem 55a arranges the Rx lead pins 55c for the Rx signals (SIG, /SIG, Vcc, Vpd and GND), while the bottom half thereof provides the lead pins 55b for the Tx signals (SIG, Vcc, MON). FIG. 6 illustrates the tri-plexer OSA 51 in upside down. As already explained, the stem 55a does not extrude the Tx ground pin. That is, the LD in the bi-directional module 55 is electrically connected between the lead pins, SIG and Vcc, to switch the current provided to the LD by the signal applied to the pin SIG. The photodiode to monitor the optical output from the LD is connected between the pins Vcc and MON.

The photodiode that receives the digital Rx signal is a type of the avalanche photodiode (hereafter denoted as APD) in the present embodiment. The APD is necessary to be biased with a several tens of voltages to show the carrier multiplication function. This bias voltage is given through the lead pin Vpd. The bi-directional module 55 installs a pre-amplifier to convert the photocurrent output from the APD into a voltage signal and to amplify this voltage signal. The pre-amplifier is powered by the voltage supplied through the lead pin Vcc and outputs two signals complementary to each other from the lead pins, SIG and /SIG.

The stem 55a of the bi-directional module 55 further provides a ground plate 56, whose plane arrangement is like an H-shape. One of four branches of this H-shape is wound around the stem 55a so as to surround the lead pins for the Tx signal, while the branches opposite to and diagonal to the branch above explained are soldered with the ground pattern on the PCB 30. Thus, the lead pins for the Tx signal are surrounded by the ground plate 56 connected to the analogue ground on the PCB 30, which may form a quasi-shielding of the Tx signal pins and may reduce the crosstalk from the Tx signal to the Rx signal.

Thus, the present bi-directional module 55, even the triplexer OSA 1 installs the Tx device and the Rx device in the common package, namely, on the common stem 55a, the lead pins 55b for the Tx signal and those 55c for the Rx signal are geometrically divided into two groups, one of which is coupled in the top side of the PCB 30, while the other is connected with the back side of the PCB 30, with the ground plate 56 arranged so as to separate these two groups of the lead pins and surround the lead pins 55b for the Tx signal. Accordingly, the Rx signal may be isolated from the Tx signal; in particular, the Rx signal may be isolated from the lead pins to supply the driving current of the LD, which may improve the crosstalk.

Figure 7:
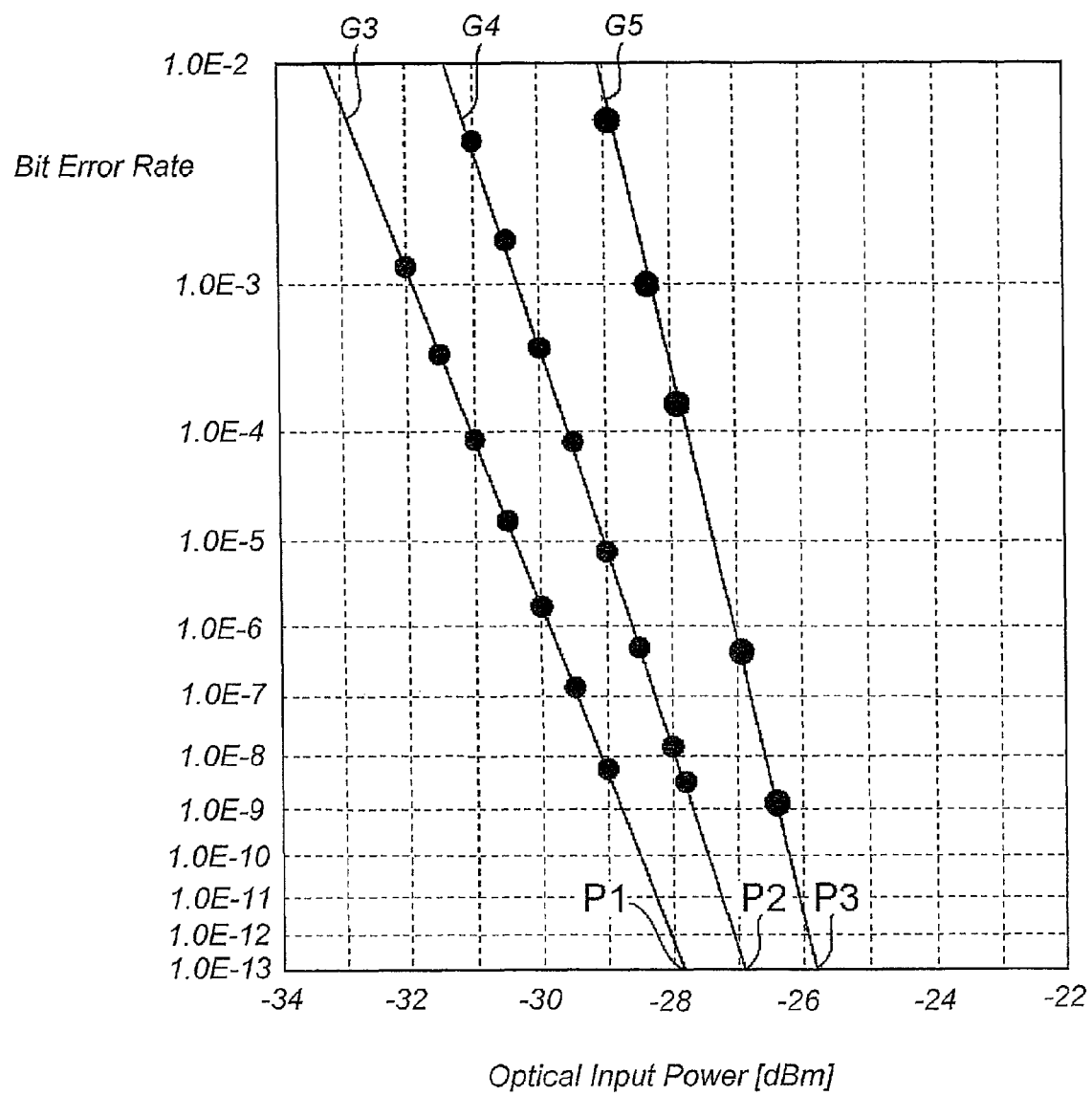
FIG. 7 shows behaviors of the bit error rate of the bi-directional module in conditions of G3: without any crosstalk, G5: without the ground plate, and G4: with the ground plate.

FIG. 7 shows an experimental result of the reduction of the crosstalk. The experiment measured the bit error rate (BRT) with the photodiode by supplying the driving current to the LD to emit light with the power of, for instance, 1.5 dBm as varying the optical receiving power to the photodiode. The behavior G3 corresponds to a condition where no driving current was supplied, which was equivalent to the no-crosstalk condition, the behavior G5 corresponds to a condition where the driving current was supplied and the bi-directional module without ground plate, and the behavior G4 denotes the result when the LD was driven and the bi-directional module with the ground plate between two groups of lead pins.

When the LD was turned off, that is, no driving current was provided thereto, the bit error rate became $1 \times 10^{-13}$ for the receiving power of −28 dBm at the point P1. While, the laser diode was practically driven with the substantial current, the same bit error rate of $1 \times 10^{-13}$ was obtained for the optical receiving power of −25.8 dBm at the point P3, which degraded by 2 dBm. Finally, the bi-directional module provided with the ground plate of the embodiment above described showed the same bit error rate for the receiving power of −27 dBm at the point P2, which was half of that obtained without the ground plate.

Figure 8:
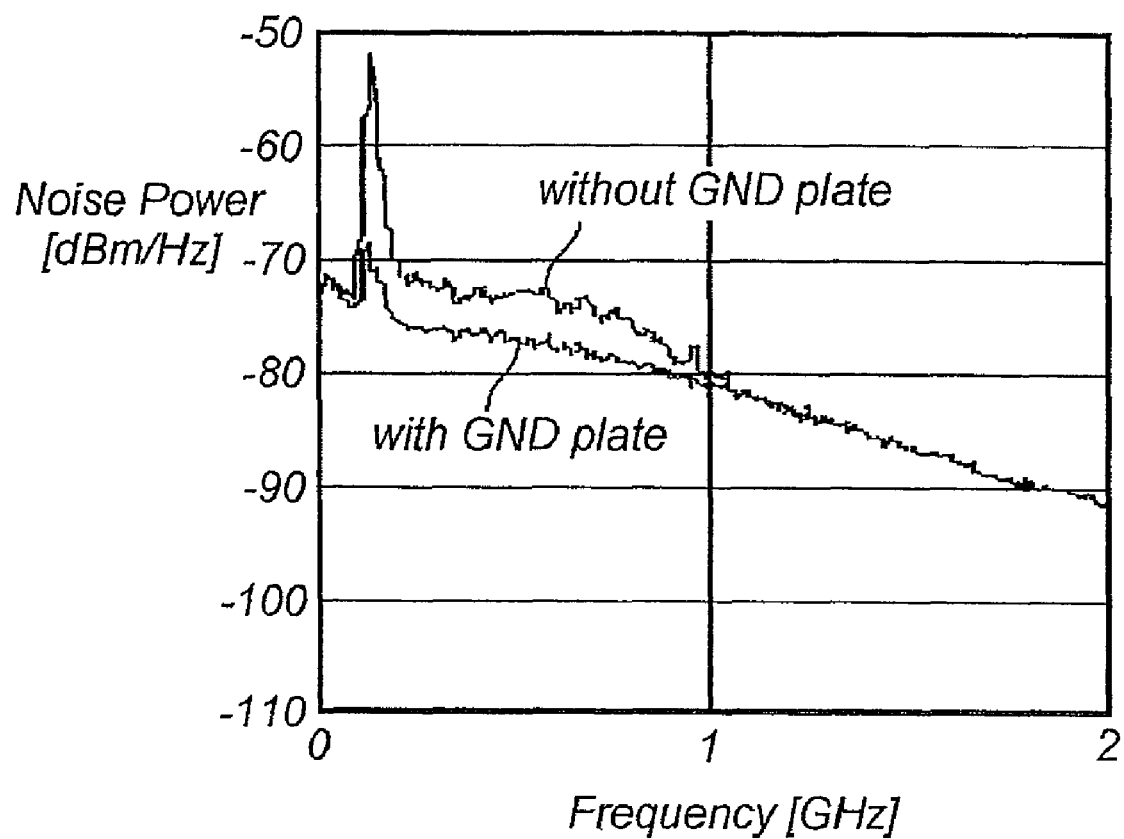
FIG. 8 shows an effect of the existence of the ground plate measured through the noise power spectrum.

FIG. 8 compares the noise appeared in the output of the digital Rx signal depending on the implementation of the ground plate. In this experiment, the receiver circuit was powered on under no optical input signal, while, the laser diode was driven with a substantial switching current whose primary speed was 2.5 Gbps through a Bessel-Thomson filter with the cut-off frequency of 1.25 GHz. The experiment compared the magnitude and the spectrum of the noise appeared in the output of the receiver circuit.

As shown in FIG. 8, the output of the receiver circuit showed a difference of about 3 to 5 dBm for a unit frequency depending on the implementation of the ground plate. In particular, the bi-directional module showed the improvement greater than 10 dBm around 150 MHz. Total difference of the noise power accumulated in whole frequencies became about 2.5 dB, which demonstrated the effect of the ground plate.

Figure 9A:
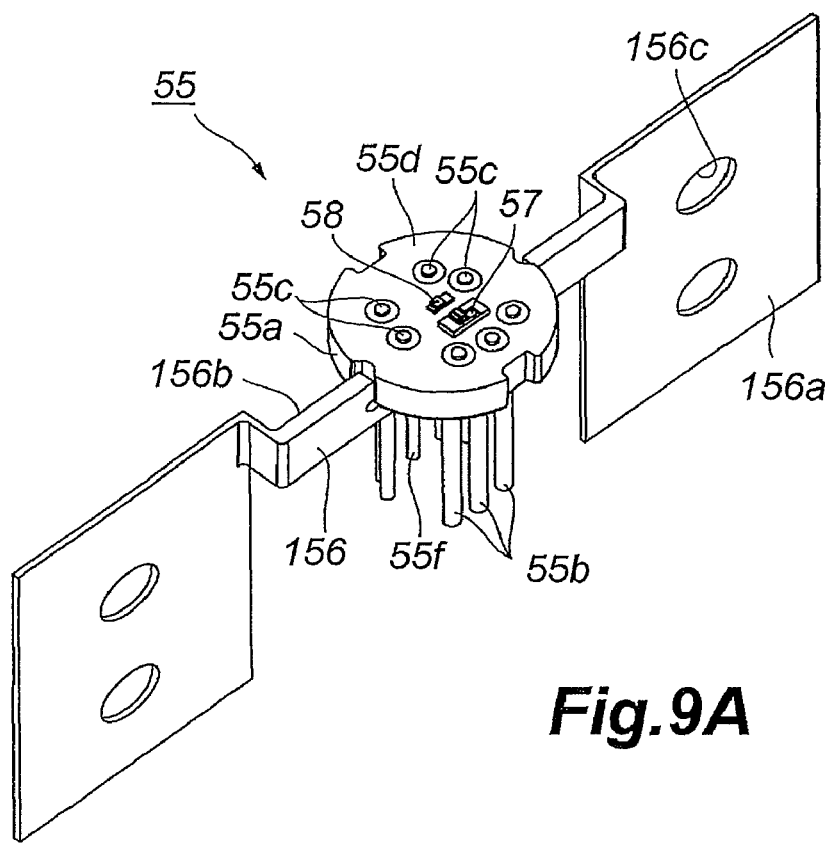
FIGS. 9A and 9B show another shape of the ground plate according to the second embodiment of the invention.
Figure 9B:
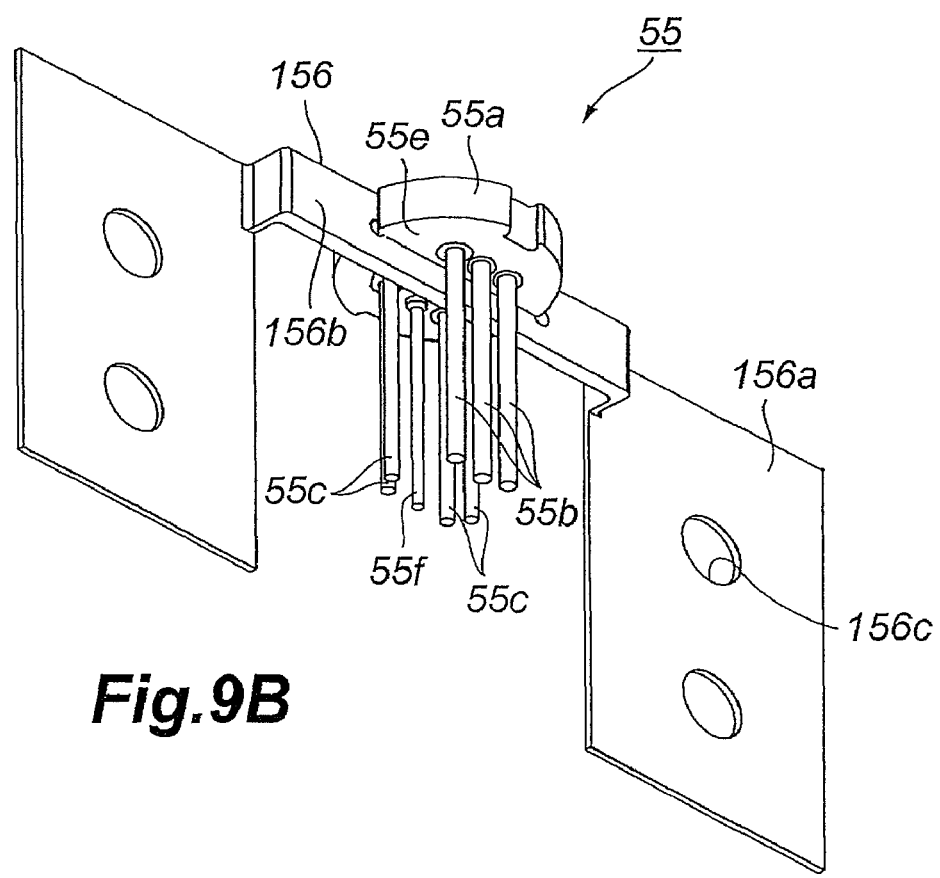

Next, some modifications of the ground plate will be described as referring to FIGS. 9 to 12. FIGS. 9A and 9B illustrate a bi-direction module 55 with the ground plate 156 according to the second embodiment of the invention, where FIG. 9A shows the bi-directional module 55 viewed from the top, while, FIG. 9B shows the module viewed from the bottom.

This bi-directional module 55 may be also coupled with the circuit provided on the PCB 30. The bi-directional module 55 provides a metal stem 55a connected with the signal ground, an LD 57, a light-receiving device such as a photodiode (PD) 58 and a metal cap to form a cavity within which the LD 57 and the PD 58 are installed. The stem 55a with a primary surface 55d and a back surface 55e has a disk shape with a diameter of, for instance, 5.6 mm. The LD 57 is mounted on the primary surface 55d through an LD sub-mount, while, the PD 58 is also mounted on the primary surface 55d of the stem 55a though a PD sub-mount. On the primary surface 55d is provided with a monitor PD and a pre-amplifier to amplify the signal output from the PD 58, which are not shown in FIG. 9A.

The bi-directional module 55 further installs a WDM filter, not shown in FIG. 9A, on the primary surface 55d thereof. The PD 58 is set on a center portion of the stem 55a, while, the LD 57 is set in a position offset from the center of the stem 55a. Between the LD 57 and the PD 58 is provided with the WDM filter; specifically, the WDM filter is arranged on an optical axis vertically extending from the PD 58 and as being inclined by 45° to the optical axis. The optical fiber is arranged above the WDM filter as the lens is interposed between the fiber and the WDM filter. The WDM filter reflects light emitted from the LD 57 toward the optical fiber, while, transmits light provided from the optical fiber toward the PD 58; thus, the function of the bi-direction with respect to the single fiber may be realized.

The bi-directional module 55 illustrated in FIGS. 9A and 9B provides three Tx lead pins 55b, four Rx lead pins 55c and one ground pin 55f. Three Tx lead pins correspond to the Tx power supply VccT, the Tx signal SigT and a monitored signal MON, while, four Rx lead pins correspond to a pair of complementary signals, SigR and /SigR, the Rx power supply VccR, and a bias for the PD Vpd, respectively. These lead pins, although they pass through the stem 55a, are fixed to the stem 55a as they are electrically isolated from the stem 55a with sealing glass.

Tip end of respective lead pins, 55b and 55c, protrude from the primary surface 55d of the stem 55a; while, the other end thereof extend from the back surface 55e. A plurality of bonding wires with a diameter of about 25 μm electrically connect the tip end of the lead pins with the electrodes of the LD 57 and those of the PD 58. Specifically, two of the Tx lead pins 55b, SigT and VccT, are connected with electrodes of the LD and the rest of the Tx lead pins, MON, is connected with one of electrodes of the monitor PD. The rest electrode of the monitor PD is connected with the Tx power supply VccT. While, the Rx lead pin Vpd is connected with the PD 58, one of rest three lead pins, VccR, is connected with the pre-amplifier to provide the power thereto, and the rest two lead pins, SigR and /SigR, are connected with the outputs of the pre-amplifier. The case pin 55f is directly connected with the stem 55a and extends from the back surface 55e of the stem 55a. As illustrated in FIG. 5, the other ends of respective Tx lead pins 55b, Rx lead pins 55c and the case pin 55f are soldered with the wiring patterns on the PCB 30.

The stem 55a, as illustrated in FIGS. 10A and 10B, comprises a Tx section E1 and an Rx section E2. FIG. 10A illustrates the arrangement of the primary surface 55d of the stem 55a, while, FIG. 10B illustrates the arrangement of the back surface 55e of the stem 55a. Between these two sections, E1 and E2, is intersected with a boundary S. Three Tx lead pins 55b position within the Tx section E1, while, four Rx lead pins 55c and the case pin 55f position in the Rx section E2. The length of the intersection S is nearly equal to the diameter of the stem 55a. The LD 57 is surrounded by the boundary S and three Tx lead pins 55b, while, the PD 58 is surrounded by the boundary S, four Rx lead pins 55c and the case pin 55f.

Referring back to FIGS. 9A and 9B, the optical module 1 implemented with the bi-directional module 55 shown in FIGS. 9A and 9B, discriminates the signal ground from the case ground to enhance the noise tolerance and the EMI tolerance. In the present optical module 1, the ground for the Rx section E2 is connected with the signal ground, while, the ground for the Tx section E1 is grounded in the case ground. Specifically, the case pin 55f set in the Rx section E2 directly extends from the stem 55a to be grounded in the signal ground on the PCB 30. Moreover, the ground plate 156 shown in FIGS. 9A and 9B, which is directly connected with the stem 55a, is also grounded to the ground pattern on the PCB 30 through the wing portion 156a. The ground plate 156 includes the wing portions 156a in both ends thereof and the center bar 156b connecting the wing portions 156a. The center bar 156b is fixed to the back surface 55e of the stem 55a by soldering. Both ends of the center bar 156b extends from the edge of the stem 55a. The wing portions 156a provide a plurality of holes 156c to fix them with the PCB 30 with screws. The center bar 156b is set along the boundary S between two sections, E1 and E2, as shown in FIGS. 10A and 10B. A region in the back surface 55e including the Tx section E1 arranges three Tx lead pins 55b, while, another region including the Rx section E2 arranges four Rx lead pins 55c and the case lead pin 55f. Thus, the ground plate 156 may electrically isolate the region including the Tx section E1 from the other region including the Rx section E2 in the back surface 55e of the stem 55a, and the Tx lead pins 55b may be also isolated from the Rx lead pins 55c.

An outer shape of the ground plate 156 is not restricted to those illustrate in FIGS. 5, 6, 9A and 9B. Other shapes may be considered to show the same function and effect with those of the ground plates, 56 and 156. FIG. 11A illustrates one type of the ground plate 256 showing a similar function with the ground plates, 56 and 156, but has a different shape, and FIGS. 11B and 11C show still another ground plate 356 with different shape.

The ground plate 256 shown in FIG. 11A provides a shortened center bar 256b arranged on the boundary S between two sections, E1 and E2. Both ends of the center bar 256b are within the back surface 55e of the stem 55a, and a length of this center bar 256b is comparable with a size of the LD 57 or the PD 58. This center bar 256b is surrounded by three Tx lead pins 55b, four Rx lead pins 55c and the case pin 55f.

The ground plate shown in FIG. 11B provides a center bar 356b including first to third portions, 356c to 356e. The first portion 356c is set along the boundary S. Both ends of the first portion 356c are within the back surface 55e of the stem 55a. The second and third portions, 356d and 356e, extend from the end of the first portion 356c along the back surface 55e. The second and third portions, 356d and 356e, are set within the Tx section E1 so as to surround the three Tx lead pins 55b and the region where the LD 57 is mounted. The second and third portions, 256d and 256e, may provide a plurality of hoes to fix the bi-directional module 55 with the ground plate 256 to the PCB 30.

The bi-directional module 55 shown in FIG. 11C provides a similar center bar with that shown in FIG. 11B but the second and third portions extend to the direction opposite to those in FIG. 11B. Specifically, the second and third portions, 356d and 356e, are arranged so as to put the four Rx lead pins 55c and the region where the PD 58 is mounted therebetween. The second and third portions, 356d and 356e, surrounds the Rx section E2 and the region where the PD 78 is mounted. Other arrangements of the ground plate 356 are the same as those shown in FIG. 11B.

Figure 12A:
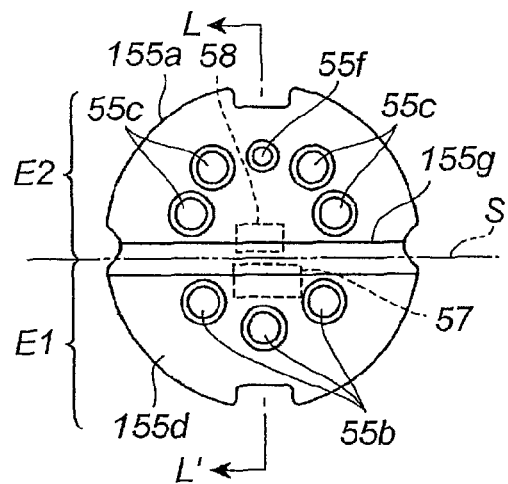
FIG. 12A schematically illustrates a modified arrangement of the stem of the bi-directional module that provides a groove to set the ground plate therein.
Figure 12B:
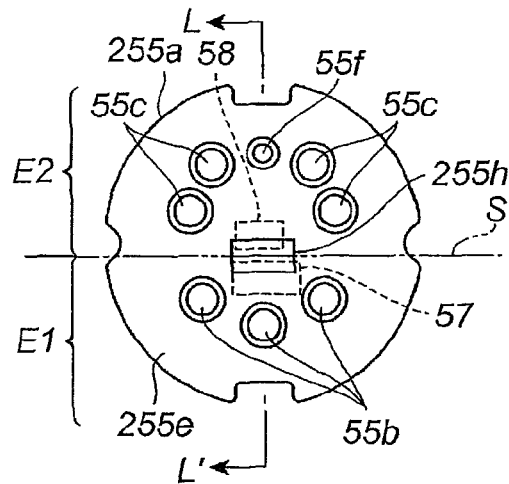
FIG. 12B illustrates a still modified arrangement of the stem that provides a hollow to set the ground plate therein.
Figure 12C:
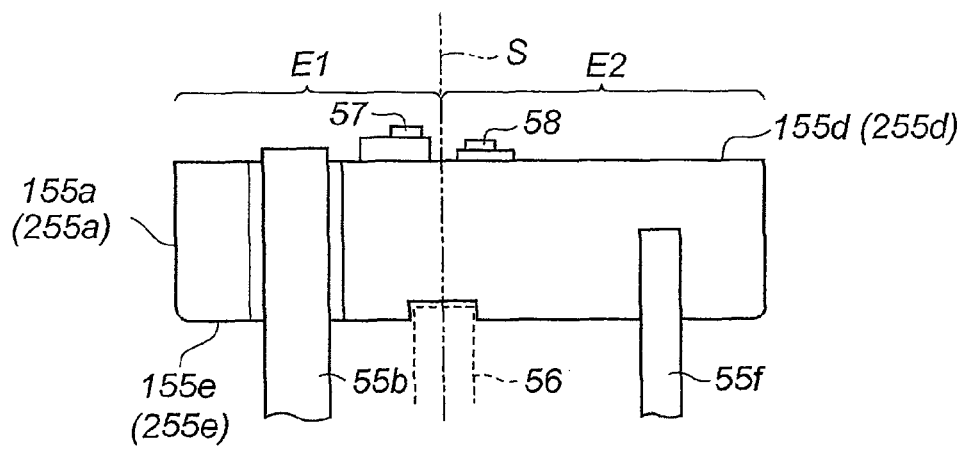
FIG. 12C is a cross section taken along the line L-L' in FIG. 12A or FIG. 12B.

FIGS. 12A and 12B explain another arrangement of the stem. The stem 155a in the back surface 155e thereof may provide a groove 155g or a hollow 155h to arrange the ground plate, 56, 156, 256 or 356, on the boundary S. FIG. 12C is a cross section taken along the line L-L' viewed from a direction intersecting the boundary S. Other arrangements of the stem, 155a or 255a, are the same with those of the stem 55a except that the modified stem, 155a or 255a, provides the groove 155g or the hollow 155h.

The back surface 155e of the stem 155a shown in FIG. 12A provides the groove 155g along the boundary S. The center bar of the ground plate 56 or else which is set within this groove 155g may be further soldered with the stem 155a. Because the position of the ground plate 56 is easily determined by this groove 155g, the assembly of the ground plate 56 or else with the stem 155 may be facilitated.

The back surface 255e of the other stem 255a shown in FIG. 12B provides the hollow 255g in a position on the boundary S. The ground plate 56 or else may be set in the center bar 56b thereof within this hollow 255h and may be further soldered with the stem 255a. In this embodiment, the center bar of the ground plate 56 or else may be easily set within this hollow 255g, the assembly of the ground plate 56 or else with the stem 255 may be facilitated.

Thus, the ground plate 56 or else according to the present invention provides following three functions: (1) reinforcing the ground potential by being electrically connected with the ground patter on the PCB 30 and electrically isolating the Rx unit from the Tx unit; (2) mechanically supporting the rear end portion of the tri-plexer OSA 51; and (3) thermally stabilizing the bi-directional module 55 by dissipating heat generated in the bi-directional module 55 to the PCB 30.

The semiconductor devices mounted on the stem 55a are active devices to generate heat. Especially, the laser diode shows large temperature dependence in performances thereof. Effective heat conduction from the stem 55a to the PCB 30 through the ground plate may improve the temperature characteristic of the bi-directional module. It is further important for the bi-directional module that the bi-directional module installs both the LD and the PD with the pre-amplifier on the same stem. Heat generated by the pre-amplifier strongly affects the performance of the LD.

A conventional optical module, even it is a bi-directional module, generally secures the heat-dissipating path from the sleeve in the front portion to the housing of the optical module that installs the bi-directional module. To fix the sleeve to the housing may concurrently secure the heat-dissipating path. Heat generated by the device within the bi-directional module is indirectly conducted to the housing. Specifically, the heat is once conducted to the stem, then to the cap mechanically fixed to the stem, then to the sleeve attached in the top of the cap and finally to the housing from the sleeve, which is inefficient heat conduction path. The ground plate of the present optical module may secure the effective heat conduction path from the stem directly to the PCB.

In addition, the optical module according to the embodiments explained above distinguishes the heat dissipating path for the ICs on the PCB 30 from the path for the bi-directional module 55. The former path from the ICs is secured by the direct contact between the ICs with the heat sink 20 attached in the inner ceiling of the metal shell 10, while, the latter path is independently secured from the stem 55*a* of the bi-directional module 55 to the PCB 30 through the ground plate, 56, 156, 256 or 356, which may release the active devices in the bi-directional module 55 from the heat generated in the ICs.

The ground plate fixed to or solder on the PCB in the wing portions thereof may release the lead pins from the mechanical stress. The bi-directional module installs both the Tx function and the Rx function in the same package, which forces to increase the count of lead pins to be prepared. On the other hand, the optical module not restricted to those of the bi-directional module is continuously requested to make the outer diameter further smaller. One solution for these contradictory requests is to form the lead pins with a smaller diameter. Accordingly, the lead pins become delicate against the mechanical stress. The conventional bi-directional module is fixed by arranging the sleeve in the front thereof against the housing of the optical transceiver or the optical module. An embodiment of the present application, although the front portion of the tri-plexer OSA may be supported by setting the necked portion between two flanges of the sleeve on the saddle 45 and the body 53 on the terrace 44 of the base 40, the rear end portion of the OSA 51 is left as substantially free.

When the bi-directional module with a slender cylindrical shape is held by the sleeve in one end thereof, the other end must be held and supported by the lead pins soldered to the PCB. Thus, the lead pins have to provide two functions, one is to transmit electrical signals and the other is to support the end portion of the module. However, as explained above, thinner lead pins with a diameter of, sometimes less than 0.5 mm, are often result in the breaking. The ground plate of the invention with the wing portions may support the rear end portion of the bi-directional module in stead of the lead pins, which may make the diameter of the lead pin further smaller.

While the preferred embodiments of the present invention have been described in detail above, many changes to these embodiments may be made without departing from the true scope and teachings of the present invention. The present invention, therefore, is limited only as claimed below and the equivalents thereof.

What is claimed is:

1. An optical module capable of receiving an analog optical signal and a digital optical signal, and transmitting another digital optical signal, comprising:
    a tri-plexer optical subassembly that provides an analog module that receives said analog optical signal with a first wavelength, a bi-directional module that receives said digital optical signal with a second wavelength and transmits said another digital optical signal with a third wavelength and a WDM filter,
    wherein said bi-directional module has a single package different from a package of said analog module, said package of said bi-directional module commonly installing a semiconductor light-receiving device for receiving said digital optical signal and a semiconductor light-emitting device for emitting said another digital optical signal,
    wherein said WDM filter discriminates said first wavelength from said second and third wavelengths, and
    wherein said bi-directional module has an optical axis substantially perpendicular with an optical axis of said analog module;
    a housing including a base made of resin and a metal shell that provides a frame ground;
    a printed circuit board that installs a first electrical circuit coupled with said analog module and a second electrical circuit coupled with said bi-directional module, said first electrical circuit being electrically isolated from said second electrical circuit except for a signal ground of said optical module; and
    a ground plate fixed to said bi-directional module and to said signal ground on said printed circuit board, said ground plate grounding said bi-directional module to said signal ground on said printed circuit board.

2. The optical module according to claim 1, wherein said ground plate dissipates heat generated in said bi-directional module to said printed circuit board.

3. The optical module according to claim 1, wherein said housing further provides a heat sink in an inner ceiling thereof, said heat sink being in directly contact with said second electronic circuit installed on said printed circuit board and being in apart from said bi-directional module.

4. The optical module according to claim 1, wherein said tri-plexer optical subassembly is physically supported by said base in a front portion thereof and by said ground plate in a rear portion thereof.

5. The optical module according to claim 4, wherein said base provides a pair of latches and a terrace, said front portion of said tri-plexer being surrounded by said pair of latches and said terrace to be supported.

6. The optical module according to claim 1, wherein said printed circuit board provides a T-shaped cut to set said tri-plexer OSA therein.

7. The optical module according to claim 1,
    wherein said bi-directional module provides a plurality of Tx lead pins for said light-emitting device and a plurality of Rx lead pins for said light-receiving device, and
    wherein said ground plate is put between said Tx lead pins and said Rx lead pins.

8. The optical module according to claim 7, wherein said Rx lead pins include an Rx ground pin directly connected to said package of said bi-directional module, and said Tx lead pins include a Tx ground pin isolated from said package of said bi-directional module.

9. The optical module according to claim 8, wherein said analog module has a ground pin electrically connected to said Rx ground of said bi-directional module.

10. The optical module according to claim 7,
    wherein said Tx lead pins are arranged in an array, and said Rx lead pins are arranged in another array, and
    wherein said ground plate is put between said array of said Tx lead pins and said other array of said Rx lead pins.

* * * * *